United States Patent [19]

Foote

[11] 4,448,134

[45] May 15, 1984

[54] UNIFORM DISPENSING OF GRANULAR MATERIAL FROM A VESSEL

[75] Inventor: Jerry B. Foote, Spokane, Wash.

[73] Assignee: Energy Products of Idaho, Coeur d'Alene, Id.

[21] Appl. No.: 415,112

[22] Filed: Sep. 7, 1982

Related U.S. Application Data

[60] Continuation-in-part of Ser. No. 170,429, Jul. 21, 1980, abandoned, Division of Ser. No. 57,479, Jul. 13, 1979, Pat. No. 4,253,824.

[51] Int. Cl.³ .......................... F23G 5/00; F23G 7/00
[52] U.S. Cl. .................................. 110/245; 34/57 A; 110/263; 110/347; 366/340; 431/7; 431/170
[58] Field of Search ...................... 110/263, 245, 347; 122/4 D; 431/7, 170; 432/58; 34/57 A; 222/195; 366/340

[56] References Cited

U.S. PATENT DOCUMENTS

| | | | |
|---|---|---|---|
| 3,009,607 | 11/1961 | Sayre | 222/195 |
| 3,155,377 | 11/1964 | Godman | 366/340 |
| 3,166,222 | 1/1965 | Schrader | 222/195 |
| 3,237,812 | 3/1966 | Kemp | 222/189 |
| 3,343,888 | 9/1967 | Anderson | 406/138 |
| 3,646,689 | 3/1972 | Kuchenthal et al. | 222/195 X |
| 3,822,919 | 7/1974 | Strom | 222/195 X |
| 4,330,502 | 5/1982 | Engstrom | 110/245 X |

*Primary Examiner*—Edward G. Favors
*Attorney, Agent, or Firm*—Lynn G. Foster

[57] ABSTRACT

A system comprising a method and apparatus by which a double cone dispenser causes discharge of granular or particulate materials from a vessel at a uniform rate across the entire cross section of the vessel. In one form, the invention comprises a fluidized bed vessel which was a tramp removal and bed recirculation system associated therewith, which system comprises a novel dual cone apparatus at the bottom of the vessel.

13 Claims, 5 Drawing Figures

UNIFORM DISPENSING OF GRANULAR MATERIAL FROM A VESSEL

CONTINUITY

This application is a continuation-in-part of my co-pending U.S. Patent Application Ser. No. 170,429, filled July 21, 1980, abandoned which was a division of my copending U.S. Patent Application Ser. No. 057,479 filed July 13, 1979, now U.S. Pat. No. 4,253,824, which issued Mar. 3, 1981.

BACKGROUND

1. Field of Invention

The present invention relates generally to the handling of granular material and more particularly to a novel system embracing method and apparatus by which a double cone dispenser causes discharge of granular material from a vessel at a uniform rate across the entire cross section of the vessel.

2. Prior Art

It is known in the art relating to the handling of granular material of providing a vertically elongated silo type storage vessel with an impervious cone-shaped bottom having a central egress opening for passage of the granular material. Characteristic of such an apparatus is that flow through the central egress opening results in the central part of the vessel discharging granular material at a rate substantially greater than near the interior walls of the vessel. In certain configurations, no discharge whatever occurs along the interior wall of the vessel and, therefore, some granular material remains in the vessel on a permanent basis. Due to this characteristic, it is impossible to achieve a "first-in, first-out" relationship between the ingress and egress granular material. Thus, different materials may not be processed through the vessel sequentially without being blended or mixed together.

It has been proposed in U.S. Pat. No. 3,155,377 that two nested cones be used to form the bottom of a hopper. Under the aforementioned U.S. Patent, incorporated by reference herein, the nested cones function as a blender to mix previously segregated dry granular material of various types into a homogenous mixture which is packaged for sale. U.S. Pat. No. 3,155,377 is incapable of providing "first-in, first-out" displacement of granular material through the vessel. It should, therefore, be noted that the purpose and function of the above described nested cone arrangement is the antithesis of the present invention.

BRIEF SUMMARY AND OBJECTS OF THE INVENTION

In brief summary, the present invention comprises a granular material dispensing system, including method and apparatus, featuring a dual cone arrangement, disposed at the bottom of a silo, bin or other vessel, by which granular material caused to be placed in the vessel is selectively discharged at a uniform rate across the entire cross section of the vessel.

The dual cone arrangement, as illustrated in the presently preferred embodiments, comprises an inner cone and an outer cone separated by a conical hollow chamber. Apertures are provided through the inner cone which are sized and arranged to provide for a constant rate of drawdown the entire granular material surface area within the vessel. This uniform drawdown is achieved by controlling the size and spacings of the apertures through the inner cone, controlling the cone angle and controlling the size of the hollow chamber.

The present invention provides for "first-in, first-out" processing of granular materials. This "first-in, first-out" capability allows different materials to be deposited as separate strata within the vessel, one upon another, without significant blending or mixing between the different types of materials. This system is also clearly advantageous when dealing with materials which have some limited storage lifetime, such as grain or feed material, because the system will not, during processing, allow accumulation of material within the vessel, which is subject to aging since all the material entering the vessel passes through on a "first-in, first-out" basis.

The invention is applicable to basically all solids handling applications in industry and may be used in grain storage facilities, farm mills or food processing facilities, mining ore storage and handling facilities, oil shale processes, etc. The device is useful in any application where uniform or even drawdown from a vessel is desired or material is to be handled on a "first-in, first-out" basis, including fluidized bed incinerators and the like which use a bed material/tramp material removal system.

With the foregoing in mind, it is a significant object of the present invention to provide a novel granular material dispensing system, including method and apparatus.

A further primary object of the present invention is to provide a novel granular material dispensing system whereby material deposited in a container or vessel is uniformly dispensed therefrom on a "first-in first-out" basis.

An important object of the present invention is to provide a novel granular material dispensing system wherein a double cone arrangement is statically disposed at the bottom of a silo, bin or other vessel and granular material, placed within the vessel, is selectively dischraged at a uniform rate across the entire cross section of the vessel.

It is a paramount object of thep present invention to provide a novel granular material dispensing system which is suitable for use as a tramp material removal system for a fluidized bed, including method and apparatus.

A further important object is the provision of a unique method and apparatus for recirculating fluidized bed material.

These and other objects and features of the present invention will be apparent from the detailed description taken with reference to the accompanying drawings.

DETAILED DESCRIPTION OF THE ILLUSTRATED EMBODIMENT

Figure 1:
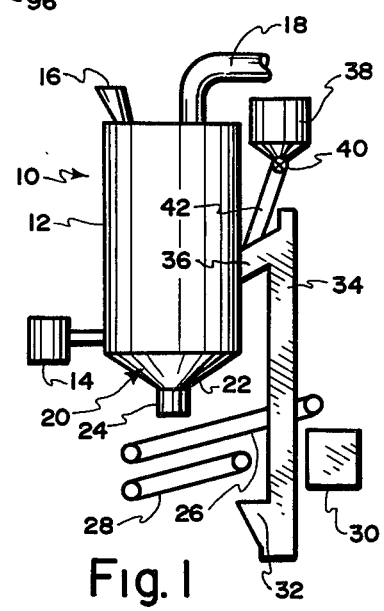
FIG. 1 is a schematic of a fluidized bed vessel having a bed recirculation system.
Figure 4:
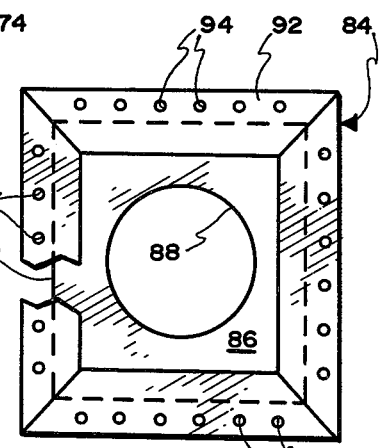
FIG. 4 is a view of the inner cone access panel taken along line 4—4 of FIG. 2.
Figure 5:
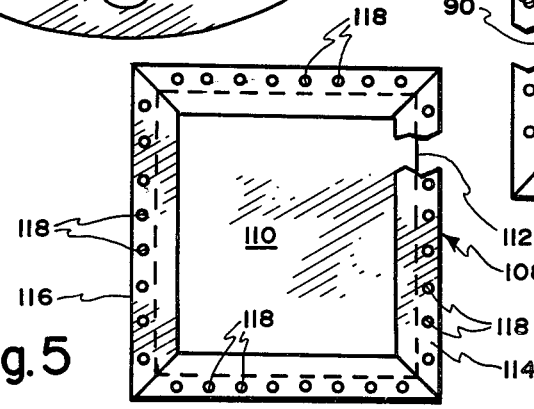
FIG. 5 is a view of the outer cone access panel taken along line 5—5 of FIG. 2.

Reference is now made to the drawings wherein like numerals are used to designate like parts throughout. While it is to be appreciated that the present invention has application to any one of several types of granular material dispensing systems, one suitable system, a fluidized bed vessel system (generally designated 10) is schematically illustrated in FIG. 1.

System 10 comprises a vessel 12 having a fluidized bed interiorly disposed in the bottom thereof. The vessel 12 is illustrated as comprising a source 14 of heat, used to initiate, stabilize and ensure continuous combustion within vessel 12, and fluidizing air which is delivered to the fluidized bed as desired in any available fashion. The vessel 12 is also illustrated as comprising an inlet 16 for solid waste or the like providing fuel for combustion processes occurring within vessel 12. Vessel 12 also comprises an off-gas discharge conduit 18. Although not shown, the off-gas may be processed in any known fashion to remove solid particles therefrom prior to release to the atmosphere. The present invention is not directed to off-gas processing gear and, therefore, no detailed explanation of such equipment is necessary.

The system 10 is also equipped with a granular material dispensing apparatus 20 disposed at the lower end of the vessel 12. This is schematically illustrated as a downwardly coverging exterior cone 22 and a discharge chute 24. In the configuration of FIG. 1, the discharge comprises bed and tramp material. A porous tramp removal conveyor 26 works in conjunction with apparatus 20 and permits the fine granular bed material to pass therethrough onto an impervious bed material conveyor 28. Conveyor 26 then delivers tramp material, which comprises the solid waste residue resulting from combustion in vessel 12, to a container 30 or the like.

The segregated bed material received and displaced by conveyor 28 is deposited by gravity in a hopper 32 and displaced by a vertical conveyor 34 to an elevated chute 36 along which the segregated, recirculated bed material moves to re-enter the vessel 12. A source 38 of new bed material is also provided. New bed material may be selectively introduced into the vessel 12 from source 38 across valve 40, and seriatim along conduit 42 and chute 36 to replace bed material lost through attrition.

Before proceeding, it must be understood that apparatus 20 of FIG. 1 relates only one use of the granular material dispensing system of the present invention. Reference is now made to FIGS. 2–5, which illustrate a novel granular material dispensing apparatus according to the present invention, which is generally designated 20. Apparatus 20 may be disposed beneath the previously described fluidized bed vessel 12 or below other vessels which store granular material. The granular material dispensing apparatus 20 comprises an apertured inner cone, generally designated 44, and a solid outer cone, generally designated 22. Each cone is preferably fabricated of steel plate material and is welded into its illustrated position.

The inner cone 44 thus comprises a metal wall 46 which is interrupted by a plurality of circular apertures 48, preferably axially oriented normal to the plane containing the metal wall 46 in each case and spaced in arcuate rows with the apertures of some adjacent rows being off-set.

In the presently preferred embodiment, the innermost ring of apertures 48 is situated a horizontal radial distance R1 from central axial 54. In the preferred embodiment, the Radius R1 may be determined by multiplying the diameter, in feet, of vessel 12 by 1.2, with the radius R1 expressed in inches.

The second ring of apertures 48 is situated a radial distance R2. Radius R2 in the described embodiment is similarly obtained by multiplying the diameter in feet, of vessel 12 by 2.7, the radius R2 being expressed in inches.

Radii 58 and 60 are likewise respectively obtained by using multipliers 3.9 and 5.1 respectively.

The total aperture area encompassed by the inner ring in the preferred embodiment is expressed as $4.44 \times 10^{-3}$ ft$^2$ per ft$^2$ of horizontal vessel area. This means that the total surface area expressed in square feet, of apertures 48 which form the inner ring will equal $4.44 \times 10^{-3}$ multiplied by $\pi$ (3.1416), which in turn is multiplied by the square of the radius of vessel 12. The total aperture area encompassed by the second, third and outer rings are similarly determined using the multiplier $2.25 \times 10^{-2}$, $2.78 \times 10^{-2}$, and $8.0 \times 10^{-2}$ respectively. A further critical design criterion requires that the apertures 48 be sized to pass the largest pieces of tramp or other material expected to be encountered.

The top of inner cone 44 has a major diameter 70 substantially the same as or slightly less than the interior diameter of the fluidized bed vessel 12, the inner cone 44 being illustrated as secured to the underside of a fluidizing air plenum 72 by welding or the like at arcuate site 74 and otherwise, as required. This suspends inner cone 44 in the static position illustrated in FIG. 2, angle 76 representing the slope of inner cone 44 with respect to the horizontal plane. In the presently preferred embodiment, angle 76 is on the order of 37°. The inner cone 44 has a horizontally disposed circular bottom plate 78 which bridges between and is integral with the sloped cone shaped wall 46. Extraordinarily large pieces of tramp or other material, if any, of a size greater than apertures 48 come to rest here.

Figure 2:
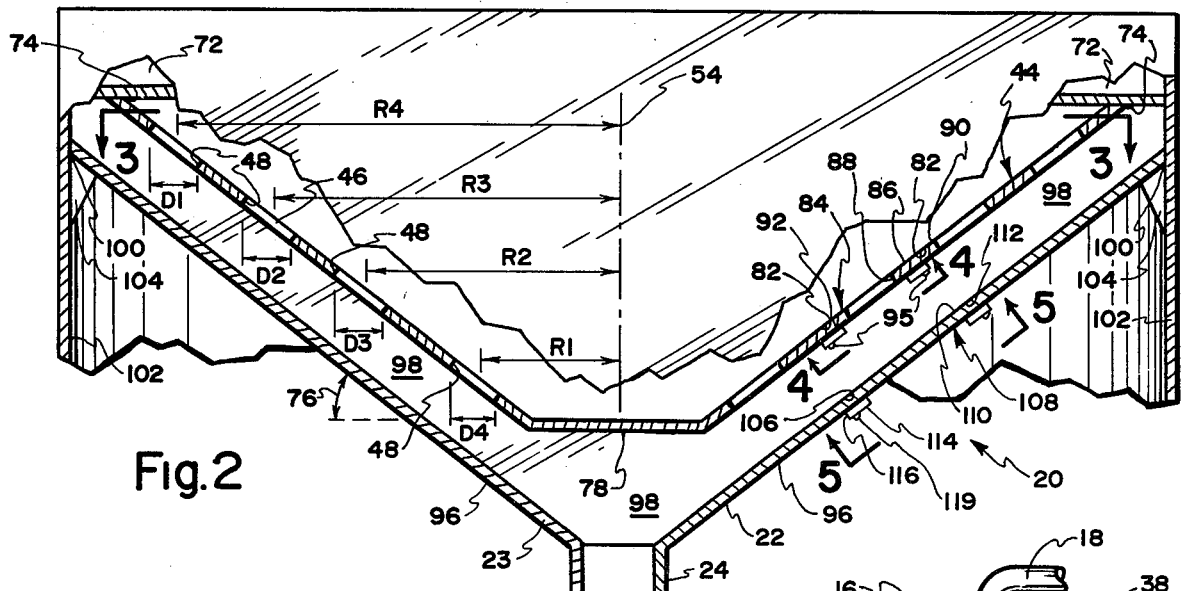
FIG. 2 is a cross section of a static dual cone granular material dispensing apparatus according to the present invention illustrated as being disposed at the bottom of a fluidized bed vessel.

The diameter of the bottom plate 78 is designated 80 (FIG. 2). The diameter 80 of plate 78, expressed in inches, is calculated in the presently preferred embodiment by multiplying the interior diameter of vessel 12, in feet by a factor of 1.5. Bottom plate 78 is illustrated as being on the order of two and one-half times the diameter of the aligned tramp and bed effluent conduit 24 of the outer cone 22.

The inner cone 44 also comprises a generally rectangular access opening 82. This opening 82 constitutes an access port in the inner cone 44. During operation, the port 82 is substantially closed by an inner cone access panel 84. See FIG. 4. Access panel 84 comprises a thin sheet metal interior 86 interrupted by a central aperture 88 (which is sized, shaped and located similar to the previously described apertures 48 for the same purpose). The plate 86 has a generally rectangular or square periphery 90 of substantially the same dimensions as opening 82 and thus fits snugly and flush within the opening 82.

Figure 3:
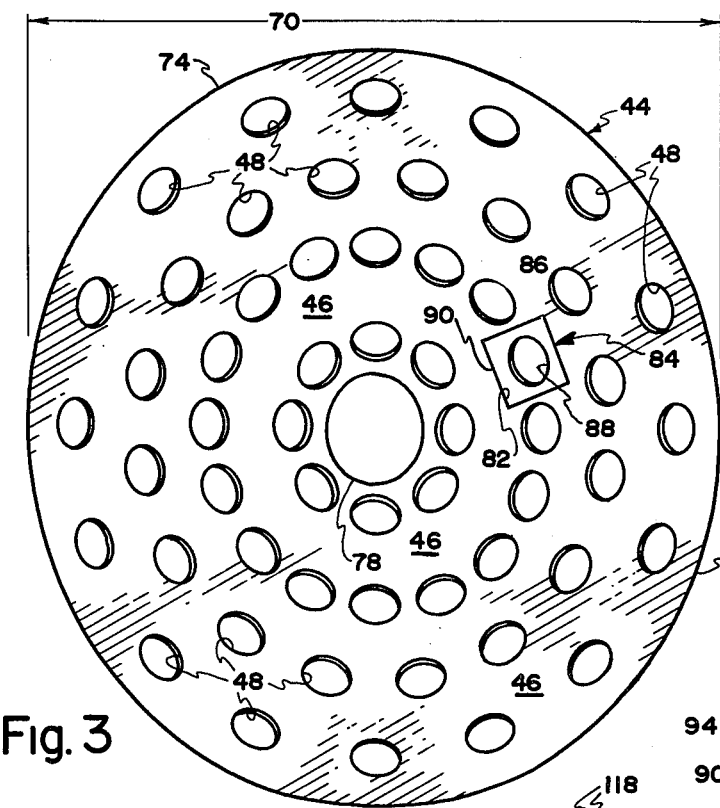
FIG. 3 is a plan view of the granular material dispensing apparatus taken along line 3—3 of FIG. 2.

A mitred frame 92 is larger than and disposed about the periphery 90 of plate 86. Frame 92 thus extends uniformly a predetermined distance beyond the periphery 90. The mitred frame 92 comprises a plurality of apertures 94 through which cap screws 95 are caused to pass and to be secured in the wall 46 of the inner cone 44 in a conventional manner, as illustrated in FIG. 3.

The access panel 84 is retained in the assembled position illustrated in FIG. 2 during operation of the fluidized bed and in particular during use of the granular material dispensing apparatus 20. When the fluidizing bed has cooled from the heat of combustion and the bed material removed, the access panel 84 may be removed for inspection, tramp removal and maintenance purposes.

Outer cone 22 comprises a sheet metal wall 96 which is conical in configuration, having the same degree of taper 76 as the inner cone 44 so that a substantially conical hollow chamber 98 of uniform thickness is caused to be situated between the two cones 44 and 22 in the assembled condition. The chamber 98 must be sized to pass the largest piece of tramp or other material which may enter any opening 48, 88.

The upper edge of the wall 96 forming the outer cone 22 is secured at annular site 100 to a metal cylindrical wall 102. Wall 102 constitutes a continuation of the bed vessel 12 wall. A plurality of spaced gusset plates 104 are illustrated as being used to provide load transferring support and stability between the upper annular edge of the outer cone 22 (which constitutes the major diameter of the outer cone) and the cylindrical wall 102. Preferably each gusset plate 104 is securedly and rigidly welded or otherwise suitably secured to both plates 22 and 102.

The plate wall 102 may be supported upon conventionally arranged structural members, concrete footings or columns or in any other suitable fashion.

An access opening 106 of rectangular configuration is provided in the wall 23 of lower cone 22 comprising the outer cone. The access opening 106 is preferably slightly larger than the previously described access opening 82 in the interior cone 44, but is in alignment therewith. The rectangular opening 106 is entirely closed by an outer cone access panel 108. As can be seen from observation of FIG. 5, panel 108 comprises a solid square or rectangular sheet metal plate 110 having an outer perimeter edge 112. The perimeter 112 is selected to be substantially the same as the size of opening 106 so that a snug edge-to-edge fit is achieved in the assembled position. The access panel 108 further comprises an enlarged rectangular or square mitred border or frame 114, the perimeter 116 of which is larger than the perimeter of the metal plate 112 and the opening 106 so that when properly installed the border 114 overlaps onto the sheet metal wall 96 of the outer cone 22. The border 114 is provided with a plurality of apertures 118 through which cap screws 119 are caused to pass and be threadedly secured into the sheet metal wall 96, as illustrated in FIG. 2.

While solid waste and other fuel is being combusted in the fluidized bed vessel 12, the access panel 108 is at all times maintained in the installed, closed position of FIG. 2. However, when the fluidized bed and the granular material dispensing apparatus 20 are no longer in use and the bed material has been removed from the vessel followed by sufficient cooling time, the panels 108 and 84 may be sequentially removed to provide access to the interior of the apparatus 20 for inspection, tramp removal, and maintenance purposes.

Granular material, in a small quantity which comes to rest upon plate 78, develops its own counter slope directed opposite to the slope of the inner cone-shaped wall, which counterslope feeds centrally descending granular material toward the first ring (at R1) of apertures 48.

Consistent with the foregoing, the present invention may be satisfactorily implemented when the vessel and the cone discharge or dispensing apparatus have any one of several sets of dimensions including but not limited to the following:

TABLE I

| | | RING RADII | | | |
|---|---|---|---|---|---|
| VESSEL DIAMETER | CENTRAL PLATE RADIUS | R1 | R2 | R3 | R4 |
| 14' | 10¼" | 1'4¾" | 3'1¾" | 4'6¼" | 5'9" |
| 16' | 12" | 1'7¼" | 3'7 5/16" | 5'2¼" | 6'9 11/16" |
| 18' | 13¼" | 1'9¼" | 4'0⅞" | 5'10¼" | 7'7¾" |
| 22' | 1'4½" | 2'2⅛" | 4'11⅛" | 7'1¾" | 9'4¼" |

TABLE II

| NUMBER OF APERTURE AND DIAMETERS | | | | | |
|---|---|---|---|---|---|
| VESSEL DIAMETER | D1 | D2 | D3 | D4 | PERPENDICULAR SPACE BETWEEN CONES (T) |
| 14' | 6–12" | 8–10" | 8–9" | 2–8" | 8¼" |
| 16' | 20–12" | 10–10" | 10–9" | 3–8" | 9⅞" |
| 18' | 32–11" | 16–9" | 16–8" | 3–8" | 10¾" |
| 22' | 32–13" | 16–11" | 16–10" | 4–9" | 13¼" |

It has been found that use of the present granular material dispensing invention embodied in apparatus 20 causes a substantially uniform flow of bed and tramp material downwardly across the entire diameter 70 of the vessel, thereby providing a "first-in, first-out" system for the bed material which has application to unloading granular material per se from a storage vessel. The tramp and bed materials do not tend to become trapped or isolated but migrates uniformly downwardly without blending, engages the sloped surface of the metal wall 46 of the inner cone 44 and is caused to slide along the wall 46 until an aperture 48 is intersected and fall through the intersected opening 48, the openings 48 being arranged so that substantially all downwardly migrating bed and tramp material will have a displacement path which intersects at least one of the eccentric apertures 48. Not only does the granular material dispensing apparatus 20 provide for homogeneous and cross sectionally uniform displacement of the granular material, but results in substantial cost savings due to the manner in which it is constructed and reliance upon the force of gravity together with the elimination of any requirement that the removal system be subjected to vibration or the like.

If desired, a valve may be placed in conduit 24 to prevent and/or control the flow of granular material from the vessel 12.

The invention may be embodied in other specific forms without departing from the spirit or essential characteristics thereof. The present embodiment is therefore considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured United States Letters Patent is:

1. A method of removing granular material from a fluidized bed vessel comprising the steps of:

causing air to be selectively displaced upwardly through a fluidized bed of substantially homogeneous granular material within the vessel;

elevating the temperature of the fluidized bed granular material;

causing combustible material to be burned within the fluidized bed thereby causing tramp material to be present in the fluidized bed;

gravity displacing the hot granular bed material and hot tramp material downwardly in a vessel passed the air displacement site;

insuring a substantially uniform rate of descent across the entire cross section of the vessel of the hot bed and tramp material as combustion continues in the bed by: interposed apertured downwardly converging funnel shaped means in the path of the granular material at the bottom of the vessel, the funnel means substantially spanning the entire cross section of the vessel but entirely closed at the lower end whereby the granular bed and the tramp materials are caused to substantially uniformly pass through the apertures of the apertured funnel means, either directly or after being deflected along the funnel means between adjacent apertures; causing the passsed granular bed and tramp materials to engage a substantially solid downwardy converging funnel means at a fixed permanent distance below and juxtaposed the apertured funnel means whereby the granular bed and tramp materials move between the two funnel means as a generally cone-shaped layer in an hour-glass fashion; and discharging the granular bed and tramp materials through a port at a central location comprising the low point of the solid downwardly converging funnel means.

2. Apparatus for simultaneously removing hot granular fluidized bed and tramp materials from a hot fluidized bed vessel comprising:

a fluidized bed vessel in which hot granular bed and accumulated tramp material are continually gravity displaced downwardly;

an air distribution system disposed below the fluidized bed by which air is selectively displaced upward through the bed;

means by which the temperature of the fluidized bed is elevated sufficient to support combustion therein;

a source of combustible material and means by which the combustible material is placed within the vessel and the fluidized bed, thereby causing tramp material to be present in the fluidized bed;

means by which hot bed and tramp materials pass downward through the air distribution region;

apertured downwardly converging funnel means having a closed lower end interposed in the downward path of the hot granular bed and tramp materials below the air distribution system at the bottom of the vessel, the funnel means substantially spanning the entire interior cross section of the vessel whereby the hot granular bed and tramp materials are caused to substantially uniformly pass through the apertures of the apertured funnel means, either directly or after being deflected along the funnel means between adjacent apertures;

a substantially solid downwardly converging funnel means disposed a predetermined unalterable distance below and juxtaposed the apertured funnel means whereby the hot granular bed and tramp materials passing the apertured funnel means engages the solid funnel means and moves between the two funnel means as a generally cone-shaped layer in an hour-glass fashion;

a port at a central location comprising the low point of the solid downwardly converging funnel means through which the granular material is discharged, whereby a substantially uniform rate of descent of the hot granular bed and tramp materials occurs across the entire interior cross section of the vessel.

3. A vessel having a longitudinal axis comprising vessel wall means and hollow interior means for containing granular or particulate material to be discharged at the bottom of the vessel, the improvement comprising discharge structure by which the granular material under force of gravity is selectively discharged at said bottom at a substantially uniform rate across the entire cross section of the hollow interior means without appreciable blending of the granular material;

the discharge structure comprising;

downwardly converging inner generally cone-shaped static wall means having a predetermined slope, the perimeter of which has an impervious relationship with the vessel wall means, the upper surface of the inner cone-shaped wall means being contiguous with the granular material disposed within the hollow interior means, the inner cone-shaped wall means comprising an array of apertures, the apertures being sized and located in a pattern such that substantially all radial planes, in respect to said longitudinal access, which intersect the inner cone-shaped wall means will also intersect at least one of the apertures;

a downwardly converging second generally cone-shaped static wall means having a preselected slope and being spaced below the interior cone-shaped wall means thereby forming chamber means between the inner and second cone-shaped wall means, the second cone-shaped wall means being impervious to the granular material passing through the apertures and comprising centrally disposed effluent means, the upper surface of the second cone-shaped wall means comprising chute means along with granular material, passed into the chamber means through the apertures, slides until reaching the effluent means.

4. A vessel according to claim 3 wherein both slopes are on the order of 37° and the chamber means are generally cone-shaped.

5. A vessel according to claim 3 wherein the effluent means comprise an axially disposed discharge conduit.

6. A vessel according to claim 3 wherein the array of apertures comprises a plurality of aperture rings each disposed at a different predetermined radius from the longitudinal axis.

7. A vessel according to claim 6 wherein the number of rings is four.

8. A vessel according to claim 6 wherein each ring has a predetermined aperture area, the aperture area of the ring having the greatest radius being larger than the aperture area of the ring having the smallest radius.

9. A vessel according to claim 3 wherein the number and size of the apertures of the ring having the greatest radius are respectively larger than the number and size of the apertures of the ring having the smallest radius.

10. A vessel according to claim 3 wherein the apertures of the array are circular in configuration.

11. A vessel according to claim 10 wherein each aperture has a vertical axis and vertical edges.

12. A vessel according to claim 3 wherein the second cone-shaped wall means are imperviously associated with the vessel wall means.

13. A method by which granular or particulate material disposed in a vessel is selectively discharged without appreciable blending at the bottom of the vessel, comprising the steps of:

drawing down under force of gravity the granular material comprised of particles from within the vessel at a substantially uniform rate across the entire cross section of the vessel in such a fashion that the rate descent of all the particles comprising the granular material is essentially uniform and the direction of descent is substantially vertical during the drawdown and discharging the drawdown at the bottom of the vessel by passing granular material through an array of apertures in a downwardly converging funnel-shaped wall, substantially all drawdown granular material which does not directly pass in a vertical path from above and through said apertures being deflected along paths each of which intersects at least one of the apertures.

* * * * *